(12) United States Patent
Park et al.

(10) Patent No.: US 11,875,255 B2
(45) Date of Patent: Jan. 16, 2024

(54) METHOD AND APPARATUS FOR PROCESSING DATA

(71) Applicant: Samsung Electronics Co., Ltd., Suwon-si (KR)

(72) Inventors: Hyunsun Park, Suwon-si (KR); Yoojin Kim, Suwon-si (KR); Hyeongseok Yu, Seoul (KR); Sehwan Lee, Suwon-si (KR); Junwoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 16/803,342

(22) Filed: Feb. 27, 2020

(65) Prior Publication Data

US 2021/0064992 A1   Mar. 4, 2021

(30) Foreign Application Priority Data

Aug. 26, 2019   (KR) ........................ 10-2019-0104578

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
None
See application file for complete search history.

(56) References Cited

U.S. PATENT DOCUMENTS

| 10,572,409 | B1* | 2/2020 | Zejda | G06N 3/082 |
| 2003/0018597 | A1* | 1/2003 | Shetty | G06N 3/08 |
| | | | | 706/12 |
| 2005/0160127 | A1* | 7/2005 | Swartzlander | G06F 17/142 |
| | | | | 708/404 |
| 2014/0282392 | A1* | 9/2014 | Shukla | G06F 9/45529 |
| | | | | 717/116 |
| 2018/0046898 | A1 | 2/2018 | Lo | |
| 2018/0121377 | A1 | 5/2018 | Woo et al. | |
| 2018/0131946 | A1 | 5/2018 | Lee et al. | |

(Continued)

FOREIGN PATENT DOCUMENTS

CN   108009626 A   5/2018
KR   10-1590896 B1   2/2016

(Continued)

OTHER PUBLICATIONS

Kung, H.T. et al., "Packing Sparse Convolutional Neural Networks for Efficient Systolic Array Implementations: Column Combining Under Joint Optimization", [online] , arXiv, 2018, pp. 1-13 [Final version].

(Continued)

*Primary Examiner* — William J Jacob
(74) *Attorney, Agent, or Firm* — NSIP Law

(57) ABSTRACT

A method of processing data in a neural network, includes identifying a sparsity of input data, based on valid information included in the input data in which the input data includes valid values and invalid values, generate rearranged input data, based on a form of the sparsity by rearranging, in the input data, location of at least one of the valid values and the invalid values, and generating, by performing a convolution on the rearranged input data in the neural network, an output.

27 Claims, 13 Drawing Sheets

(56) References Cited

U.S. PATENT DOCUMENTS

| | | | |
|---|---|---|---|
| 2019/0042529 A1 | 2/2019 | Nurvitadhi et al. | |
| 2019/0050371 A1 | 2/2019 | Araki | |
| 2019/0087713 A1 | 3/2019 | Lamb et al. | |
| 2020/0027247 A1* | 1/2020 | Minnen | G06T 3/40 |
| 2020/0117997 A1* | 4/2020 | Yao | G06N 3/063 |
| 2020/0151569 A1* | 5/2020 | Yan | G06N 3/04 |
| 2020/0213079 A1* | 7/2020 | Kreeger | G06F 7/4806 |
| 2020/0311181 A1* | 10/2020 | Azizi | G06F 9/30036 |
| 2021/0158171 A1* | 5/2021 | Rausch | H04L 67/1097 |

FOREIGN PATENT DOCUMENTS

| | | |
|---|---|---|
| KR | 10-2018-0052069 A | 5/2018 |
| WO | WO 2017/154946 A1 | 9/2017 |

OTHER PUBLICATIONS

Japanese Office Action dated Mar. 8, 2022, in counterpart Japanese Patent Application No. 2020-109945 (6 pages in English and 3 pages in Japanese).

Albericio et al., "Bit-Pragmatic Deep Neural Network Computing," Oct. 20, 2016, 12 pages.

Choi et al., "Low Cost Convolutional Neural Network Accelerator Based on Bi-Directional Filtering and Bit-Width Reduction," IEEE Access, Mar. 15, 2018, vol. 6, pp. 14734-14746.

Lascorz et al. "Bit-Tactical: Exploiting Ineffectual Computations in Convolutional Neural Networks: Which, Why, and How," Mar. 9, 2018, 14 pages.

Lu, Liqiang, and Yun Liang, "SpWA: An Efficient Sparse Winograd Convolutional Neural Networks Accelerator on FPGAs", 2018 55th ACM/ESDA/IEEE Design Automation Conference (DAC), IEEE, 2018 (6 pages in English).

Pinar, Ali, and Michael T. Heath, "Improving Performance of Sparse Matrix-Vector Multiplication", SC'99: Proceedings of the 1999 ACM/IEEE Conference on Supercomputing. IEEE, 1999 (9 pages in English).

Montagne, Euripides, and Anand Ekambaram, "An optimal storage format for sparse matrices", Information Processing Letters 90.2 (2004): 87-92 (6 pages in English).

Kung, H. T., Bradley McDanel, and Sai Qian Zhang, "Packing Sparse Convolutional Neural Networks for Efficient Systolic Array Implementations: Column Combining Under Joint Optimization," Proceedings of the Twenty-Fourth International Conference on Architectural Support for Programming Languages and Operating Systems, 2019 (14 pages in English).

Extended European Search Report dated Feb. 5, 2021 in counterpart EP Patent Application No. 20187569.7 (9 pages in English).

* cited by examiner

FIG. 2
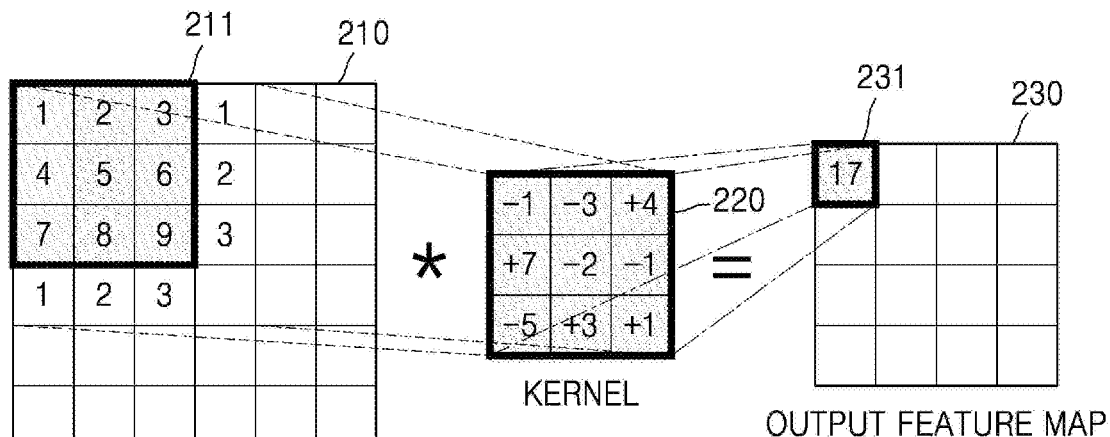
INPUT FEATURE MAP    KERNEL    OUTPUT FEATURE MAP
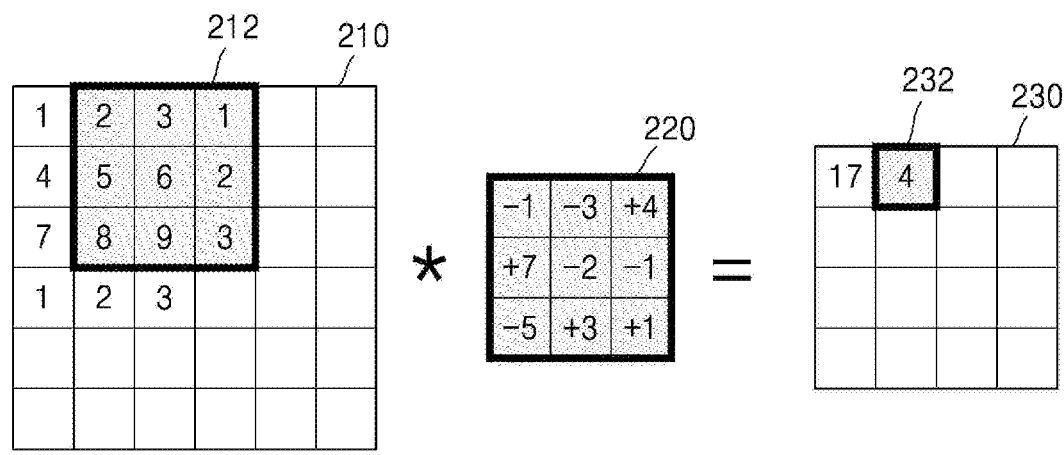
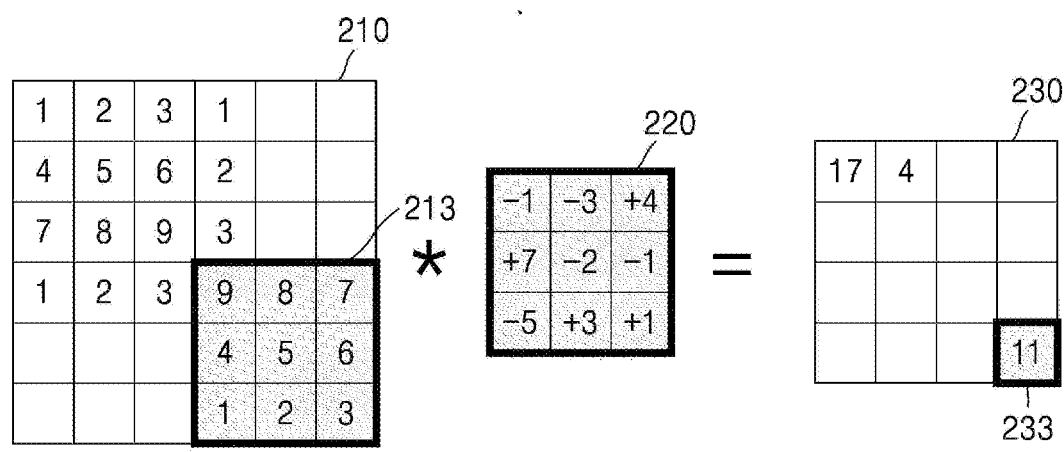

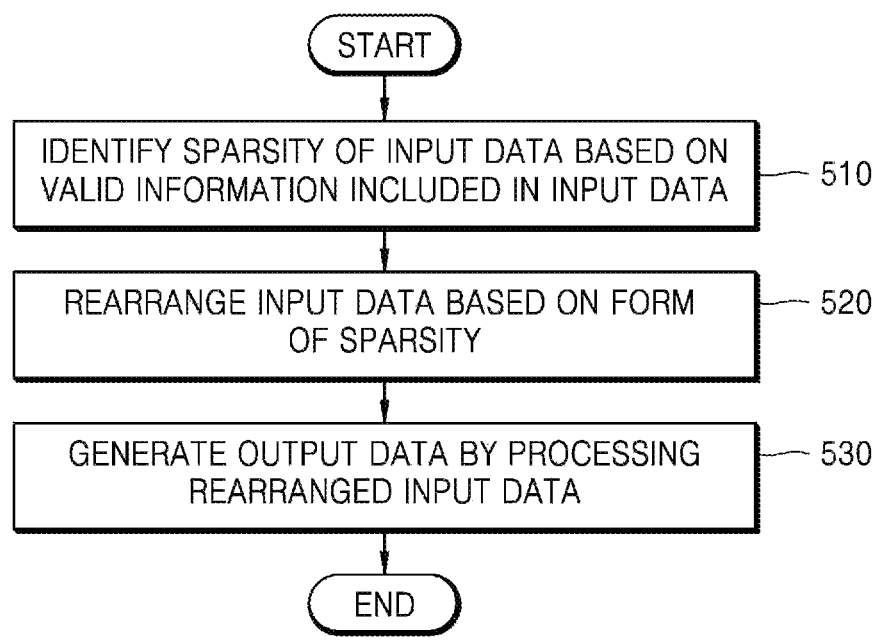

METHOD AND APPARATUS FOR PROCESSING DATA

CROSS-REFERENCE TO RELATED APPLICATION

This application claims the benefit under 35 USC § 119(a) of Korean Patent Application No. 10-2019-0104578, filed on Aug. 26, 2019 in the Korean Intellectual Property Office, the entire disclosure of which is incorporated herein by reference for all purposes.

BACKGROUND

1. Field

The following description relates to methods and apparatuses for processing data.

2. Description of the Related Art

A neural network refers to a computational architecture using the biological brain as a model. According to recent developments in neural network technology, input data is analyzed by using a neural network apparatus in various types of electronic systems and valid information is extracted.

A neural network apparatus performs a large number of operations with respect to input data. Studies have been conducted on a technology capable of efficiently processing a neural network operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatuses for processing data, and a computer-readable recording medium having recorded thereon a program for executing the methods on a computer.

In one general aspect, a method of processing data includes identifying a sparsity of input data, based on valid information included in the input data, rearranging the input data, based on a form of the sparsity, and generating output data by processing the rearranged input data.

Rearranging the input data may include rearranging the input data based on a distribution of invalid values included in the input data.

Rearranging the input data may include rearranging rows included in the input data based on a number of invalid values included in each of the rows of the input data.

Rearranging the input data may include performing rearrangement such that a first row of the input data including the most invalid values among the rows of the input data is adjacent to a second row of the input data including the least invalid values among the rows of the input data.

Rearranging the input data may include shifting elements of columns included in the input data according to a first rule.

The first rule may include shifting the elements of the columns included the input data in a same direction by a particular size, and the first rule may be periodically applied to the columns included in the input data.

Rearranging the input data may include rearranging columns included in the input data to skip processing with respect to at least one column including only invalid values among the columns included in the input data.

Rearranging the input data may include shifting a first element of a first column included in the input data to a position corresponding to a last element of a second column of the input data that is adjacent to the first column.

Generating the output data may include applying one or both of a second rule and a third rule to the rearranged input data; and performing a convolution operation on the rearranged input data to which the one or both of the second rule and the third rule is applied and another data.

In another general aspect, a non-transitory computer-readable recording medium has recorded thereon a program for executing the method on a computer.

In another general aspect, an apparatus for processing data includes a memory in which at least one program is stored, and a processor configured to execute the at least one program, in which the processor is configured to identify a sparsity of input data, based on valid information included in the input data, rearrange the input data, based on a form of the sparsity, and generate output data by processing the rearranged input data.

In another general aspect, an apparatus includes one or more memories storing one or more programs, and one or more processors configured to execute at least one of the one or more programs to determine a location in input data that includes an invalid value, generate rearranged data by manipulating the location in the input data that includes the invalid value, and apply a rule to the rearranged data.

The one or more processors may execute at least one of the one or more programs to generate the rearranged data by shifting a valid value included in the input data to the location in the input data that includes the invalid value.

The one or more processors may execute at least one of the one or more programs to generate the rearranged data by moving the invalid value to another location in the input data.

The one or more processors may execute at least one of the one or more programs to generate the rearranged data by removing the invalid value from the input data.

The one or more processors may execute at least one of the one or more programs to apply the rule to valid values included in a window of the rearranged data to minimize a total number of invalid values included in an input layer of the window to be input to a logic circuit.

The rule may include shifting at least one valid value included in a layer of the window of the rearranged data that is adjacent to the input layer to a corresponding position of the input layer that includes an invalid value.

The rule may include shifting at least one valid value included in a layer of the window of the rearranged data that is adjacent to the input layer to a transversal position of the input layer that includes an invalid value.

Other features and aspects will be apparent from the following detailed description, the drawings, and the claims.

BRIEF DESCRIPTION OF THE DRAWINGS

FIGS. 2 and 3 are diagrams illustrating examples of a convolution operation in a neural network.

FIG. 5 is a flowchart of an example of a method of processing data.

Figure 1:
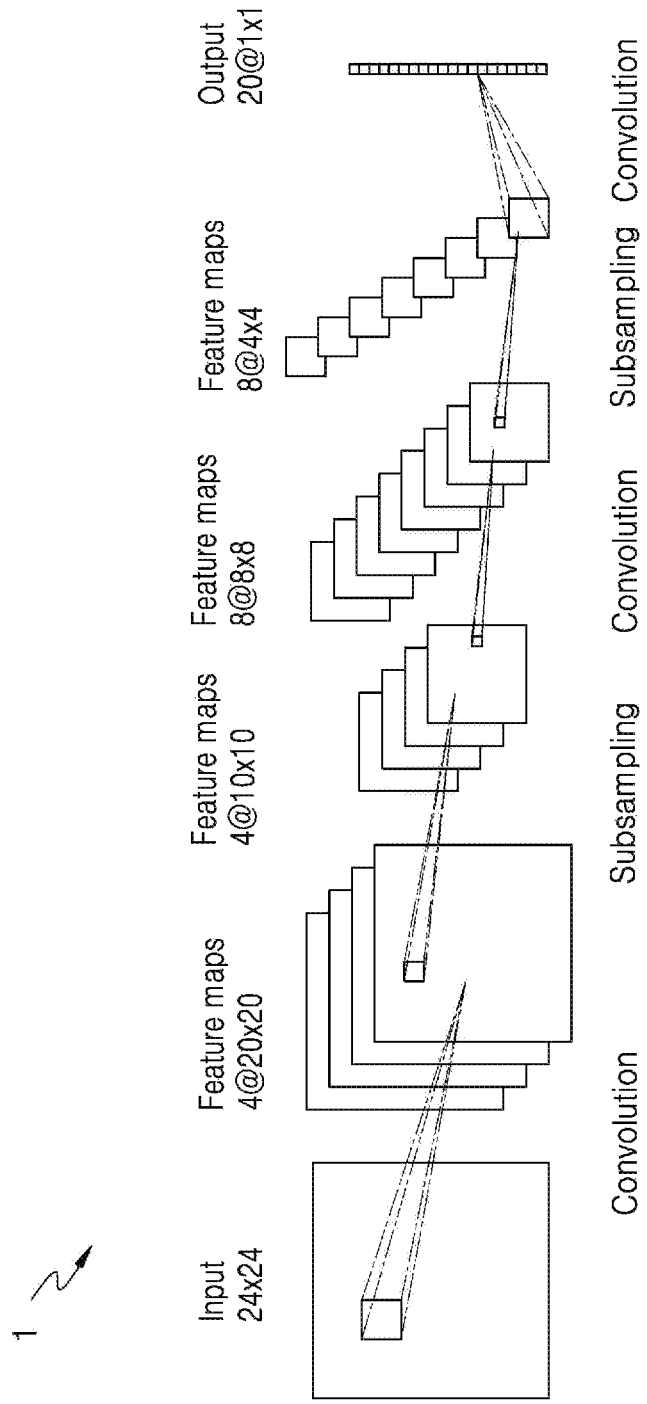
FIG. 1 is a diagram illustrating the architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings.

FIG. 1 is a diagram illustrating the architecture of a neural network.

Referring to FIG. 1, the neural network 1 may be architecture of a deep neural network (DNN) or an n-layer neural network. The DNN or n-layer neural network may correspond to a convolutional neural network (CNN), a recurrent neural network (RNN), a deep belief network, or a restricted Boltzmann machine. For example, the neural network 1 may be a CNN, but is not limited thereto. In FIG. 1, some convolution layers of a CNN corresponding to an example of the neural network 1 is illustrated, but the CNN may further include, in addition to the illustrated convolution layers, a pooling layer or a fully connected layer.

The neural network 1 may be embodied as architecture having a plurality of layers including an input image, feature maps, and an output. In the neural network 1, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 1.

For example, when an input image having a 24×24 pixel size is input to the neural network 1 of FIG. 1, the input image may be output as feature maps of four channels each having a 20×20 pixel size, through a convolution operation with a kernel. Then, sizes of the 20×20 feature maps may be reduced through the repeated convolution operations with the kernel, and finally, features each having a 1×1 pixel size may be output. In the neural network 1, a convolution operation and a sub-sampling (or pooling) operation may be repeatedly performed in several layers so as to filter and output robust features, which may represent the entire input image, from the input image, and derive the recognition result of the input image through final features that are output.

Figure 3:
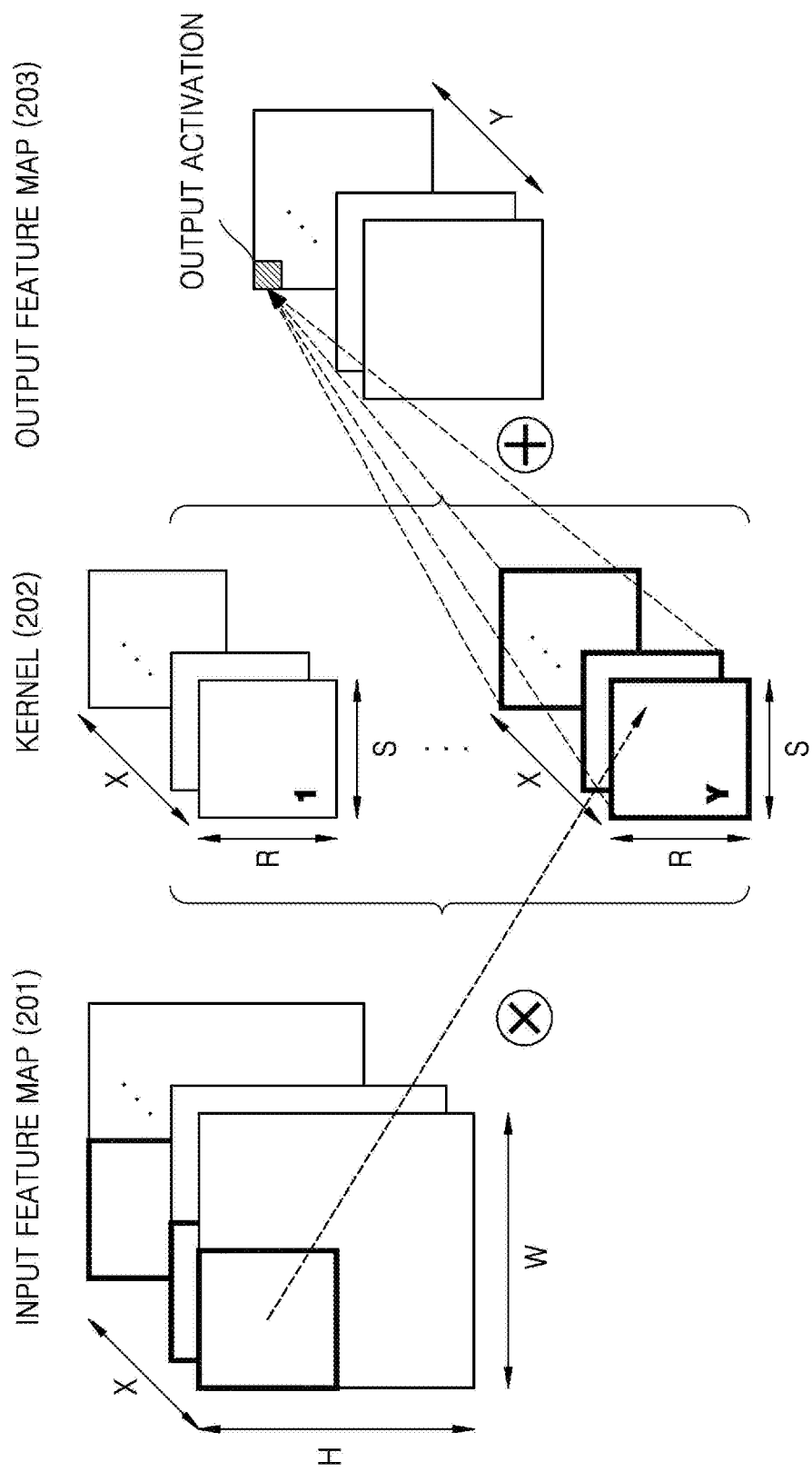

FIGS. 2 and 3 are diagrams illustrating examples of a convolution operation in a neural network.

Referring to FIG. 2, an input feature map 210 has a 6×6 pixel size, a kernel 220 has a 3×3 pixel size, and an output feature map 230 has a 4×4 pixel size, but sizes are not limited thereto. The neural network may include feature maps and kernels having various sizes. Also, values defined in the input feature map 210, the kernel 220, and the output feature map 230 are only examples, and are not limited thereto.

The kernel 220 performs a convolution operation while sliding on the input feature map 210 in a region (or tile) unit having a 3×3 pixel size. The convolution operation denotes an operation in which each pixel value of the output feature map 230 is obtained by adding all values obtained by multiplying each pixel value of any region of the input feature map 210 by a weight that is a corresponding element of the kernel 220.

The kernel 220 may first perform a convolution operation with a first region 211 of the input feature map 210. In other words, pixel values of 1, 2, 3, 4, 5, 6, 7, 8, and 9 of the first region 211 are respectively multiplied by weights of −1, −3, +4, +7, −2, −1, −5, +3, and +1 of elements of the kernel 220, and as a result, values of −1, −6, 12, 28, −10, −6, −35, 24, and 9 are obtained. Then, the values of 1, −6, 12, 28, −10, −6, −35, 24, and 9 are added to obtain a value of 17, and accordingly, a pixel value 231 of a first row and a first column of the output feature map 230 is determined to be the value of 17. Here, the pixel value 231 of the first row and the first column of the output feature map 230 corresponds to the first region 211.

Similarly, a convolution operation is performed between a second region 212 of the input feature map 210 and the kernel 220, and thus a pixel value 232 of the first row and a second column of the output feature map 230 is determined to be 4. Finally, a convolution operation is performed between a sixteenth region 213, i.e., a last window of the input feature map 210, and the kernel 220, and thus a pixel value 233 of a fourth row and a fourth column of the output feature map 230 is determined to be 11.

A two-dimensional (2D) convolution operation has been described with reference to FIG. 2, but a convolution operation may alternatively correspond to a three-dimensional (3D) convolution operation, wherein input feature maps, kernels, and output feature maps of a plurality of channels exist, as will be described with reference to FIG. 3.

Referring to FIG. 3, an input feature map 201 may have a 3D size, there are X input channels in the input feature map 201, and a 2D input feature map of each input channel may have a size of H rows and W columns, wherein X, W, and H are each a natural number. A kernel 202 may have a 4D size, and there may be as many 2D kernels, each having a size of R rows and S columns, as X input channels and Y output channels, wherein R, S, and Y are each a natural number. In other words, the kernel 202 may have a number of channels corresponding to the number X of input channels of the input feature map 201 and the number Y of output channels of the output feature map 203, wherein a 2D kernel of each channel may have a size of R rows and S columns.

The output feature map 203 may be generated via a 3D convolution operation between the 3D input feature map 201 and the 4D kernel 202, and Y channels may exist based on a result of the 3D convolution operation.

A process of generating an output feature map via a convolution operation between one 2D input feature map and one 2D kernel is as described above with reference to FIG. 2, and the 2D convolution operation described in FIG. 2 is repeatedly performed between the input feature map 201 of X input channels and the kernel 202 of Y output channels to generate the output feature maps 203 of the Y output channels.

Figure 4:
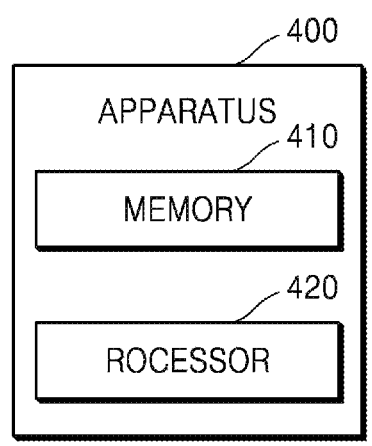
FIG. 4 is a block diagram of an example of an apparatus for processing data.

FIG. 4 is a block diagram of an example of an apparatus for processing data.

Referring to FIG. 4, an apparatus 400 for processing data may include a memory 410 and a processor 420. Although not shown in FIG. 4, the apparatus 400 for processing data may be connected with an external memory. The apparatus 400 for processing data, illustrated in FIG. 4, may include components associated with the current example. Thus, it would be obvious to those of ordinary skill in the art that other general-purpose components other than the components illustrated in FIG. 4 may be further included in the apparatus 400 for processing data.

The apparatus 400 for processing data may be an apparatus in which the above-described neural network is implemented with reference to FIGS. 1 through 3. For example, the apparatus 400 for processing data may be implemented with various types of devices such as a personal computer (PC), a server device, a mobile device, an embedded device, etc. In detail, the apparatus 400 for processing data may be included in a smartphone, a tablet device, an augmented reality (AR) device, an Internet of Things (IoT) device, an autonomous vehicle, a robotic device, or a medical device, which performs voice recognition, image recognition, and image classification using a neural network, but is not limited thereto. The apparatus 400 for processing data may correspond to an exclusive hardware (HW) accelerator mounted on such a device, and may be an HW accelerator, such as a neural processing unit (NPU), a tensor processing unit (TPU), or a neural engine, which is an exclusive module for driving a neural network.

The memory 410 stores various data processed in the apparatus 400 for processing data. For example, the memory 410 may store data processed or to be processed in the apparatus 400 for processing data. Also, the memory 420 may store applications or drivers to be driven by the apparatus 400 for processing data.

For example, the memory 410 may include random-access memory (RAM), such as dynamic random-access memory (DRAM) or static random-access memory (SRAM), read-only memory (RAM), electrically erasable programmable read-only memory (EEPROM), a CD-ROM, a Blu-ray disk, optical disk storage, a hard disk drive (HDD), a solid state drive (SSD), or a flash memory.

The processor 420 may control overall functions for driving the neural network in the apparatus 400 for processing data. For example, the processor 420 may control the apparatus 400 for processing data in general by executing programs stored in the memory 410. The processor 420 may be embodied as a central processing unit (CPU), a graphics processing unit (GPU), or an application processor (AP) included in the apparatus 400 for processing data, but is not limited thereto.

The processor 420 may read or write data, for example, image data, feature map data, or kernel data, from or to the memory 410, and execute the neural network by using the read/written data. When the neural network is executed, the processor 420 may drive processing units provided therein to repeatedly perform a convolution operation between an input feature map and a kernel, thereby generating data related to an output feature map. Here, an operation count of the convolution operation may be determined based on various factors, such as the number of channels of the input feature map, the number of channels of the kernel, the size of the input feature map, the size of the kernel, and precision of a value.

For example, the processing unit may include a logic circuit for a convolutional operation. That is, a processing unit may include an operator implemented with a combination of a multiplier, an adder, and an accumulator. The multiplier may include a combination of a plurality of sub-multipliers, and the adder may also include a combination of a plurality of sub-adders.

The processor 420 may further include an on-chip memory that manages a cache function for processing a convolution operation and a dispatcher that dispatches various operands, such as pixel values of an input feature map and weights of a kernel. For example, the dispatcher may dispatch operands such as pixel values and weight values required for an operation to be performed by a processing unit from data stored in the memory 410 to the on-chip memory. Then, the dispatcher may dispatch the operands dispatched to the on-chip memory again to a processing unit for the convolution operation.

The processor 420 performs a convolution operation between input feature map data and kernel data, such that when data that is subject to an operation includes invalid information, the operation may be an unnecessary operation. For example, when data that is subject to an operation is 0, a convolution operation between data outputs 0, such that this unnecessary operation merely increases the amount of computation of the processor 420.

Meanwhile, input feature map data and kernel data may be expressed as a matrix of M rows and N columns, wherein M and N are natural numbers. That is, an input feature map matrix and a kernel matrix may include a plurality of elements, among which the number of elements including 0 is proportional to the number of unnecessary operations.

The apparatus 400 for processing data may rearrange input data based on valid information (e.g., data other than 0) included in input data (e.g., input feature map data and kernel data). Herein, rearrangement of input data may mean an operation of changing an original architecture of a matrix such as changing positions of some elements included in the matrix or skipping some rows or columns included in the matrix.

Thus, the apparatus 400 for processing data may output a valid result without performing an unnecessary operation, thereby reducing a total amount of computation while outputting a desired result.

Hereinbelow, with reference to FIGS. 5 through 13, a description will be made of examples in which the apparatus 400 for processing data rearranges input data and processes the rearranged data to generate output data.

FIG. 5 is a flowchart illustrating an example of a method of processing data.

Referring to FIG. 5, a method of processing data may include operations performed in time-series by the apparatus 400 for processing data, illustrated in FIG. 4. Thus, it may be seen that matters described above in relation to the apparatus 400 for processing data illustrated in FIG. 4, although omitted below, are also applicable to the method of processing data illustrated in FIG. 5.

In operation 510, the processor 420 may identify a sparsity of input data based on valid information included in the input data.

The input data may mean a target on which the processor 420 is to perform a convolution operation. For example, the input data may include image data, feature map data, or kernel data. The feature map data may be input feature map data or output feature map data. The processor 420 may perform a convolution operation in a plurality of layers, and output feature map data in a previous layer may be input feature map data in a next layer. Thus, input data of operation 510 may be input feature map data or output feature map data. As described in detail with reference to FIG. 4, the input data may be a matrix including elements as data.

The valid information may mean data on which a meaningful convolution operation may be performed. In general, information may be expressed as a number, such that valid information may mean data that is a non-zero number. In other words, data of meaningless information may be expressed as 0.

The processor 420 may identify a sparsity of input data. Herein, the sparsity may mean existence or absence of a blank in data or a state of data including a blank. As described above, the valid information may be expressed as data that is a non-zero number. Thus, zero data may mean meaningless information, which may be interpreted as blank data (that is, absence of data). Thus, when the processor 420 identifies sparsity of input data, it may mean that the processor 420 identifies a distribution of 0 in the input data.

Hereinbelow, with reference to FIGS. 6A and 6B, a description will be made of an example in which the processor 420 identifies sparsity of input data.

Figure 6A:
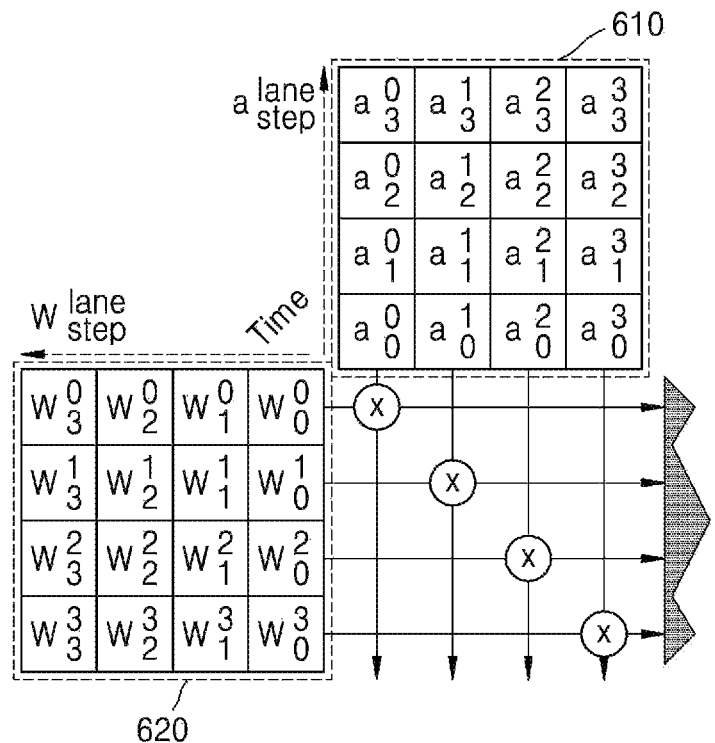
FIGS. 6A and 6B are views illustrating an example in which a processor identifies sparsity of input data.
Figure 6B:
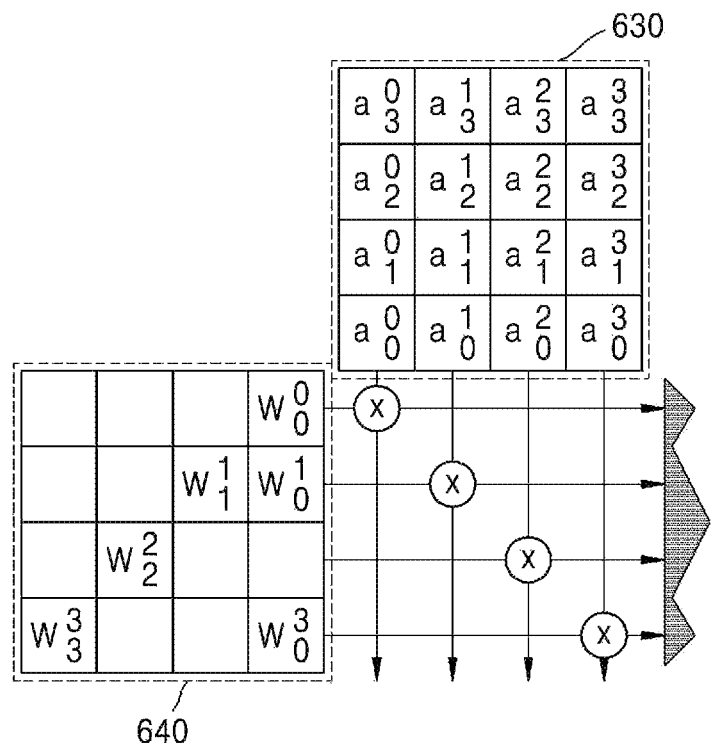

FIGS. 6A and 6B illustrate an example in which a processor identifies sparsity of input data.

FIGS. 6A and 6B schematically illustrate a convolution operation performed by the processor 420. The processor 420 may generate output data by performing a convolution operation among input data 610, 620, 630, and 640. For example, the input data 610, 620, 630, and 640 may be expressed as a matrix, and the processor 420 may generate output data by performing a sum-of-product calculation among elements of a channel included in the matrix.

Input feature map data 610 and kernel data 620 as input data are illustrated in FIG. 6A, and input feature map data 630 and kernel data 640 are illustrated in FIG. 6B. Hereinbelow, for convenience, an element included in the input feature map data 610 and 630 will be referred to as activation, and an element included in the kernel data 620 and 640 will be referred to as weights.

When comparing the kernel data 620 with the kernel data 640, blanks are included in a part of the kernel data 640. Herein, the blank may be interpreted as a weight of 0. That is, the kernel data 640 may have a higher sparsity than the kernel data 620, and it may mean that more weights included in the kernel data 640 than weights included in the kernel data 620 have 0.

Meanwhile, it is illustrated that 0 is included in the kernel data 640 in FIGS. 6A and 6B, but the disclosure is not limited thereto. In other words, 0 may be included in at least one of the input data 610, 620, 630, and 640, and the number of 0s and a form in which 0 is distributed in the input data 610, 620, 630, and 640 may vary.

The processor 420 may identify a sparsity of the input data 610, 620, 630, and 640 based on valid information (e.g., a non-zero number) included in the input data 610, 620, 630, and 640. In other words, the processor 420 may identify a distribution of 0 in the input data 610, 620, 630, and 640.

Referring back to FIG. 5, in operation 520, the processor 420 may rearrange input data based on a form of the sparsity of input data.

The processor 420 may rearrange input data based on a distribution of 0 in the input data. For example, the processor 420 may rearrange a plurality of rows based on the number of 0s included in each of the plurality of rows of the input data. In another example, the processor 420 may shift elements of each of a plurality of columns of the input data according to a first rule.

In another example, the processor 420 may rearrange the plurality of columns to skip processing with respect to at least one column including only 0s among the plurality of columns of the input data. In another example, the processor 420 may shift the first element of a first column of the input data to a position corresponding to the last element of a second column that is adjacent to the first column.

With reference to FIGS. 7 through 10, a description will be made of examples in which the processor 420 rearrange input data.

Figure 7:
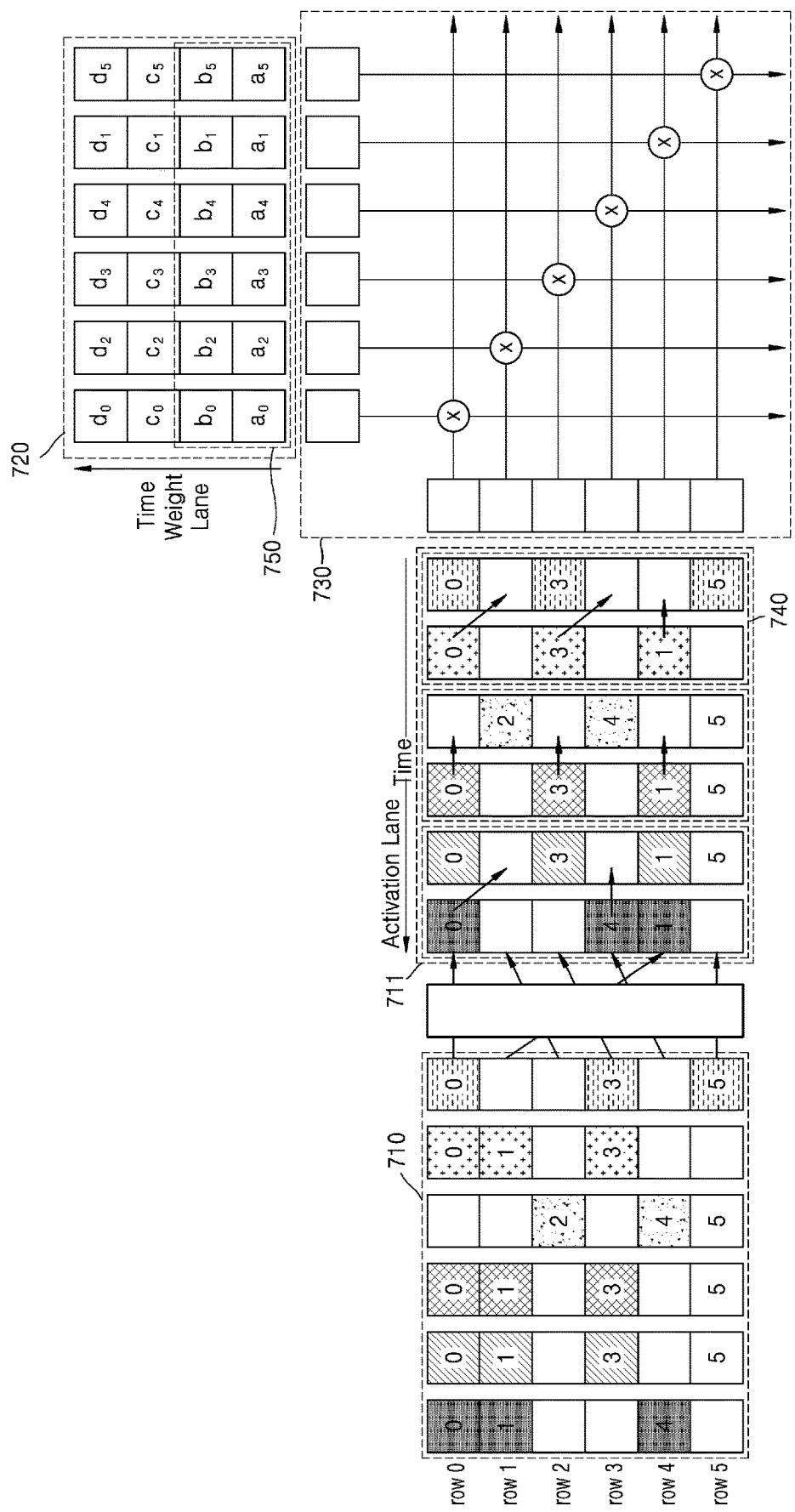
FIG. 7 is a view illustrating an example in which a processor rearranges input data.

FIG. 7 is a view illustrating an example in which a processor rearranges input data.

Input feature map data 710 and kernel data 720 as input data are illustrated in FIG. 7. The input feature map data 710 is illustrated as a matrix of 6 rows and 6 columns, and the kernel data 720 is illustrated as a matrix of 6 rows and 4 columns, but the configuration is not limited thereto.

A part of the input feature map data 710 may include blanks. Herein, the blank may be interpreted as absence of valid information, and for example, activation corresponding to the blank may be equivalent to 0. It is illustrated that the blank is included in the input feature map data 710 in FIG. 7, but the configuration is not limited thereto. That is, 0 may also be included in at least one of weights included in the kernel data 720.

The processor 420 may rearrange the input feature map data 710 based on a form of a sparsity of the input feature map data 710. For example, the processor 420 may rearrange a plurality of rows 0 through 5 included in the input feature map data 710, based on the number of blanks included in each of the plurality of rows 0 through 5.

More specifically, referring to the input feature map data 710 and feature map data 711, the processor 420 may perform rearrangement such that the row 2 having the most blanks and the row 0 having the least blanks among the plurality of rows 0 through 5 are adjacent to each other. The processor 420 may also perform rearrangement such that the row 4 having the second most blanks and the row 3 having the second least blanks among the plurality of rows 0 through are adjacent to each other. In this way, the processor 420 may generate the feature map data 711 by rearranging the plurality of rows 0 through 5 of the input feature map data 710, based on the number of included blanks.

Using the feature map data 711 generated by rearrangement, the processor 420 may minimize performing of an unnecessary operation. For example, for a convolution operation with the kernel data 720, the processor 420 may input the feature map data 711 to a logic circuit 730 for each part. The processor 420 may input activations of the input feature map data 711, which are included in a window 740, to the logic circuit 730.

The processor 420 may also input weights included in a window 750 to the logic circuit 730 by applying the window 750 having the same size as the window 740 to the kernel data 720. The processor 420 may rearrange the kernel data 720 to correspond to the feature map data 711. The order of activations input to the logic circuit 730 in the feature map data 711 and the order of activations input to the logic circuit 730 in the input feature map data 710 are different from each other. Thus, when weights are input to the logic circuit 730 without rearrangement of the kernel data 720, an inaccurate operation result may be output.

The processor 420 may rearrange the kernel data 720 such that weights to be calculated with the activations input to the logic circuit 730 are accurately input to the logic circuit 730. The processor 420 may input the weights to the logic circuit 730 according to the rearranged kernel data 720. Thus, an accurate operation result may be output from the logic circuit 730 even with the feature map data 711.

When the kernel data 720 is rearranged, the processor 420 may rearrange the input feature map data 710 in the same manner as described above and input the rearranged input feature map data 710 to the logic circuit 730.

The processor 420 may prevent an unnecessary convolution operation from being performed by adjusting positions of the activations included in the window 740. An example in which the processor 420 performs a convolution operation by adjusting the positions of the activations included in the window 740 will be described with reference to FIGS. 11 through 13.

Figure 8:
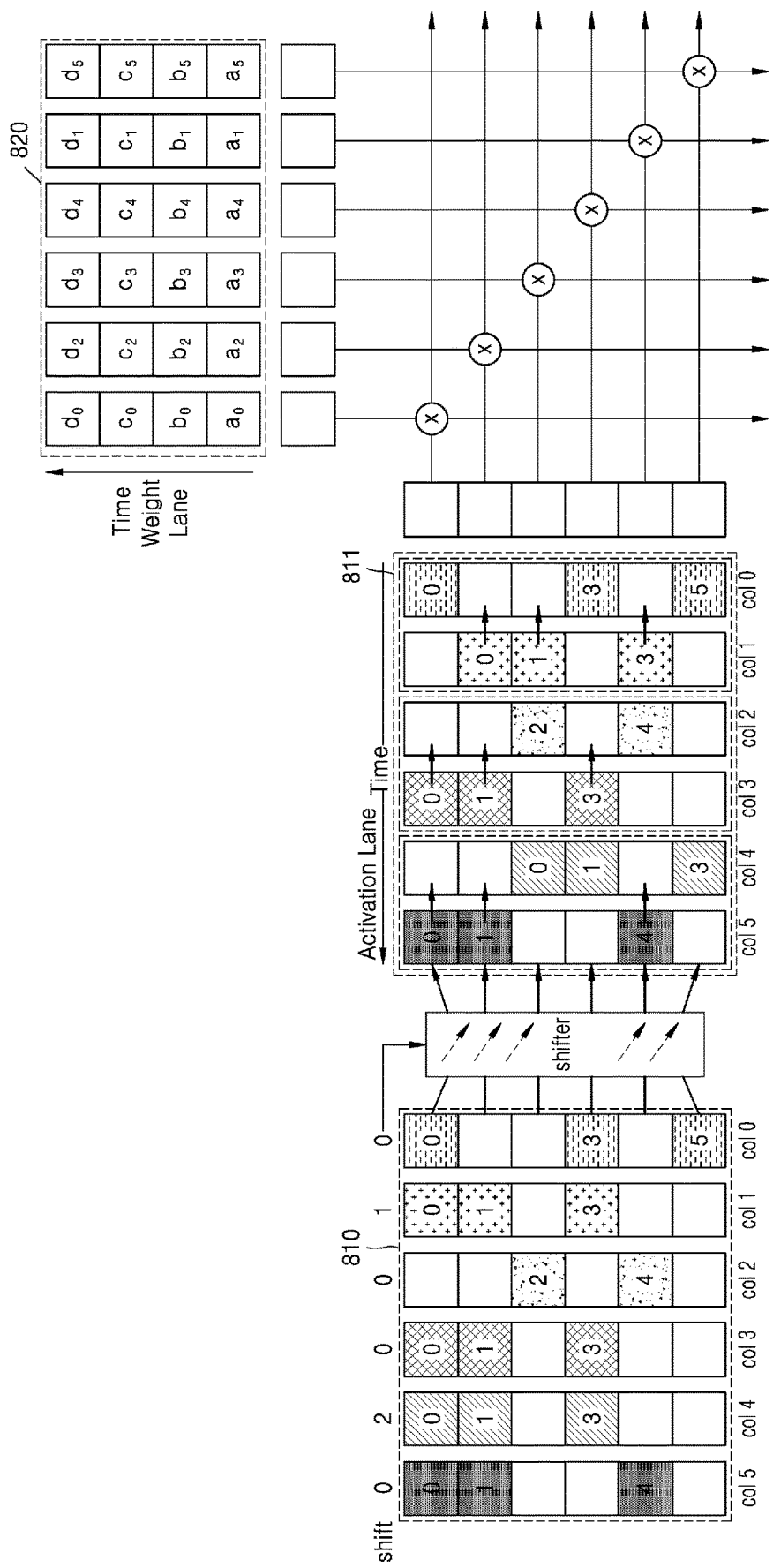
FIG. 8 is a view illustrating an example in which a processor rearranges input data.

FIG. 8 is a view illustrating another example in which a processor rearranges input data.

Input feature map data 810 and kernel data 820 as input data are illustrated in FIG. 8. A part of the input feature map data 810 may include blanks. It is illustrated that the blank is included in the input feature map data 810 in FIG. 8, but the configuration is not limited thereto. That is, 0 may also be included in at least one of weights included in the kernel data 820.

The processor 420 may rearrange the input feature map data 810 based on a form of a sparsity of the input feature map data 810. For example, the processor 420 may shift elements of each of a plurality of columns 0 through 5 included in input feature map data 810 according to a first rule.

The first rule may shift the elements of each of the plurality of columns 0 through 5 in the same direction by a particular size. Herein, the particular size may be adaptively changed by the processor 420 based on a form of a sparsity of the input feature map data 810, and a size applied to each of the plurality of columns col 0 through 5 may differ. For example, referring to the feature map data 810 and feature map data 811 generated by rearrangement, the processor 420 may generate the second column col 1 of the feature map data 811 by shifting activations included in the second column col 1 of the feature map data 810 by one box. The processor 420 may generate the fifth column col 4 of the feature map data 811 by shifting activations included in the fifth column col 4 of the feature map data 810 by two boxes. According to a form of a sparsity of the feature map data 810, the processor 420 may not shift activations for other columns col 0, 2, 3, and 5 of the feature map data 810.

The first rule may be periodically applied to the plurality of columns col 0 through 5. As illustrated in FIG. 8, the processor 420 may periodically apply a shifting rule of '0-1-0-0-2-0' to feature map data to be input next of the feature map data 810. For example, the period may be, but not limited to, the same as a size of the kernel data 820. Through this process, the processor 420 may prevent an unnecessary convolution operation from being performed.

The processor 420 may rearrange the kernel data 820 to correspond to the feature map data 811. For example, the processor 420 may rearrange the kernel data 820 such that weights to be calculated with the activations input to a logic circuit 730 are accurately input to the logic circuit. The processor 420 may input the weights to the logic circuit according to the rearranged kernel data. Thus, an accurate operation result may be output from the logic circuit even with the feature map data 811.

When the kernel data 820 is rearranged, the processor 420 may rearrange the input feature map data 810 in the same manner as described above and input the rearranged input feature map data 811 to the logic circuit 730.

An example in which the processor 420 generates output data by processing the feature map data 811 and the kernel data 820 will be described with reference to FIGS. 11 through 13.

Figure 9:
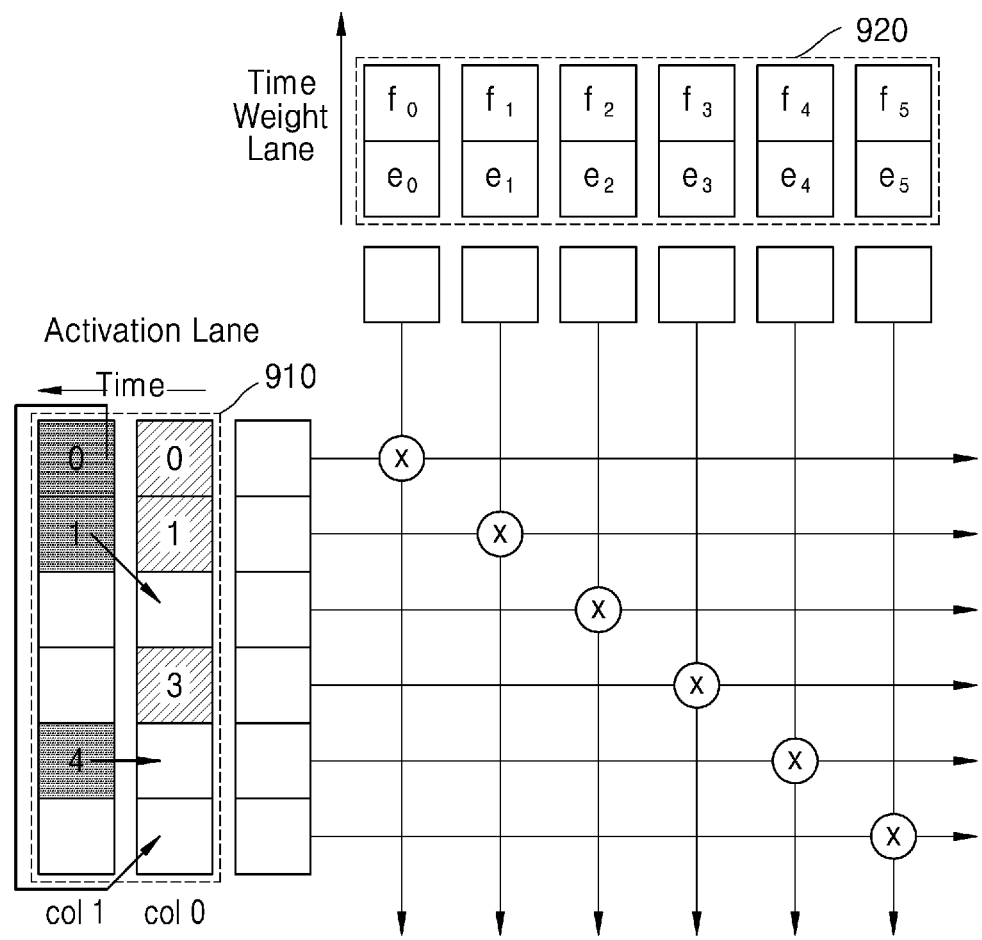
FIG. 9 is a view illustrating an example in which a processor rearranges input data.

FIG. 9 is a view for illustrating another example in which a processor rearranges input data.

Input feature map data 910 and kernel data 920 as input data are illustrated in FIG. 9. A part of the input feature map data 910 may include blanks. It is illustrated that the blank is included in the input feature map data 910 in FIG. 9, but the configuration is not limited thereto. That is, 0 may also be included in at least one of weights included in the kernel data 920.

The processor 420 may rearrange the input feature map data 910 based on a form of a sparsity of the input feature map data 910. For example, the processor 420 may shift the first element (activation) of a column col 1 included in the input feature map data 910 to a position corresponding to the last element (activation) of a column col 0 that is adjacent to the column col 1.

More specifically, valid information is included in the first positions of the column col 1 and the column col 0. Valid information is not included in the last position of the column col 0. In this case, the processor 420 may shift the element in the first position of the column col 1 to the last position of the column col 0. Through this process, the processor 420 may prevent an unnecessary convolution operation from being performed. Likewise, the processor 420 may shift the element in the second position of the column col 1 to the third position of the column col 0 and may shift the element in the fifth position of the column col 1 to the fifth position of the column col 0.

When the input feature map data 910 is rearranged, the kernel data 920 may also be rearranged, as described above with reference to FIGS. 7 and 8.

Figure 10:
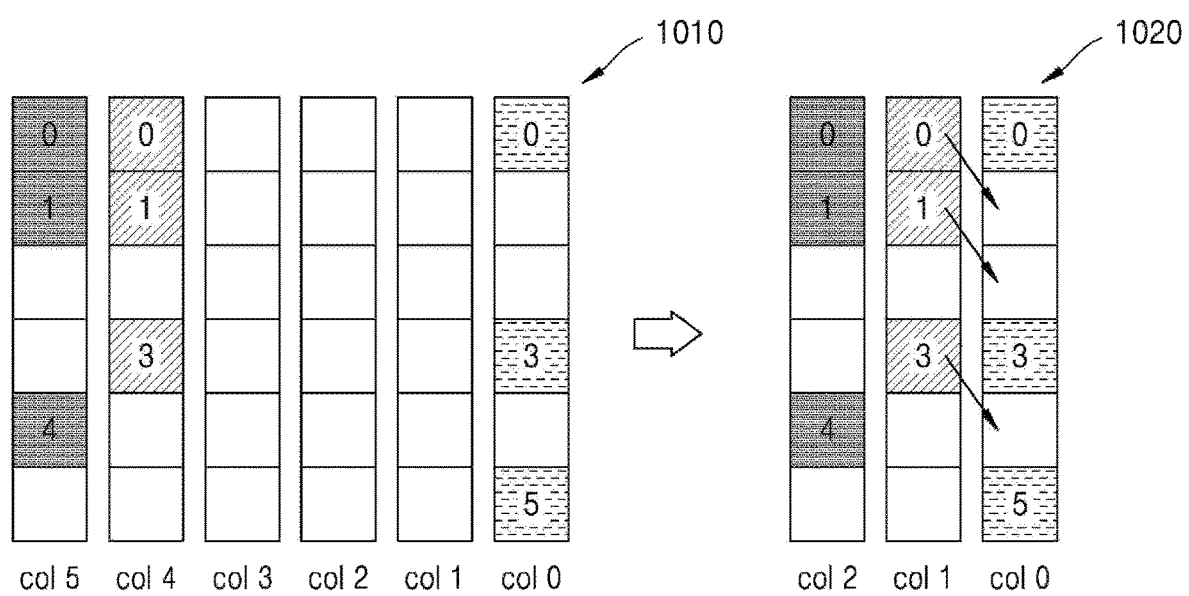
FIG. 10 is a view illustrating an example in which a processor rearranges input data.

FIG. 10 is a view illustrating another example in which a processor rearranges input data.

Input feature map data 1010 is illustrated in FIG. 10. A part of the input feature map data 1010 may include blanks. In particular, some columns col 1 through 3 of the input feature map data 1010 may include only blanks.

The processor 420 may rearrange the input feature map data 1010 based on a form of a sparsity of the input feature map data 1010. For example, the processor 420 may rearrange the input feature map data 1010 to skip processing with respect to the columns col 1 through 3 including only blanks among the plurality of columns col 0 through 5 included in the input feature map data 1010.

For example, the processor 420 may omit the columns col 1 through 3 from the input feature map data 1010 and generate feature map data 1020 merely with the other columns col 0, 4, and 5. The processor 420 may record omission of the columns col 1 through 3 in the memory 410. Through this process, the processor 420 may prevent an unnecessary convolution operation from being performed.

When the input feature map data 1010 is rearranged, the kernel data may also be rearranged, as described above with reference to FIGS. 7 and 8.

Referring back to FIG. 5, in operation 530, the processor 420 may generate output data by processing the rearranged input data.

For example, the processor 420 may generate output data by performing a convolution operation using the rearranged input data. However, the processor 420 may additionally apply a second rule or a third rule to the rearranged data of operation 520 to reduce an unnecessary operation.

Hereinbelow, an example in which the processor 420 generates output data will be described with reference to FIGS. 11 through 13.

Figure 11:
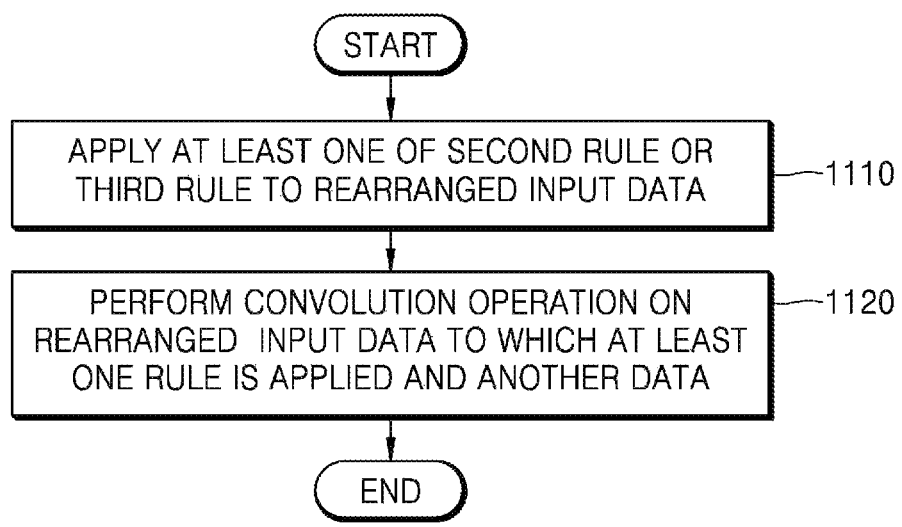
FIG. 11 is a flowchart illustrating an example in which a processor generates output data by processing rearranged data.

FIG. 11 is a flowchart illustrating an example in which a processor generates output data by processing rearranged data.

In operation 1110, the processor 420 may apply at least one of the second rule or the third rule to rearranged data.

As described above with reference to FIG. 7, the processor 420 may sequentially input the rearranged data to a logic circuit. For example, the processor 420 may apply a window having a particular size to the rearranged data and input elements included in the window to the logic circuit. When some of the elements included in the window include invalid information (e.g., 0 or blank), the processor 420 may rearrange the elements included in the window by applying the second rule or the third rule.

In operation 1120, the processor 420 may perform a convolution operation on data to which at least one rule is applied, and another data. For example, the processor 420 may perform the convolution operation by inputting rearranged activations or rearranged weights to the logic circuit.

Hereinbelow, a description will be made of an example in which the processor 420 applies the second rule to the rearranged data with reference to FIG. 12 and an example in which the processor 420 applies the third rule to the rearranged data with reference to FIG. 13.

Figure 12:
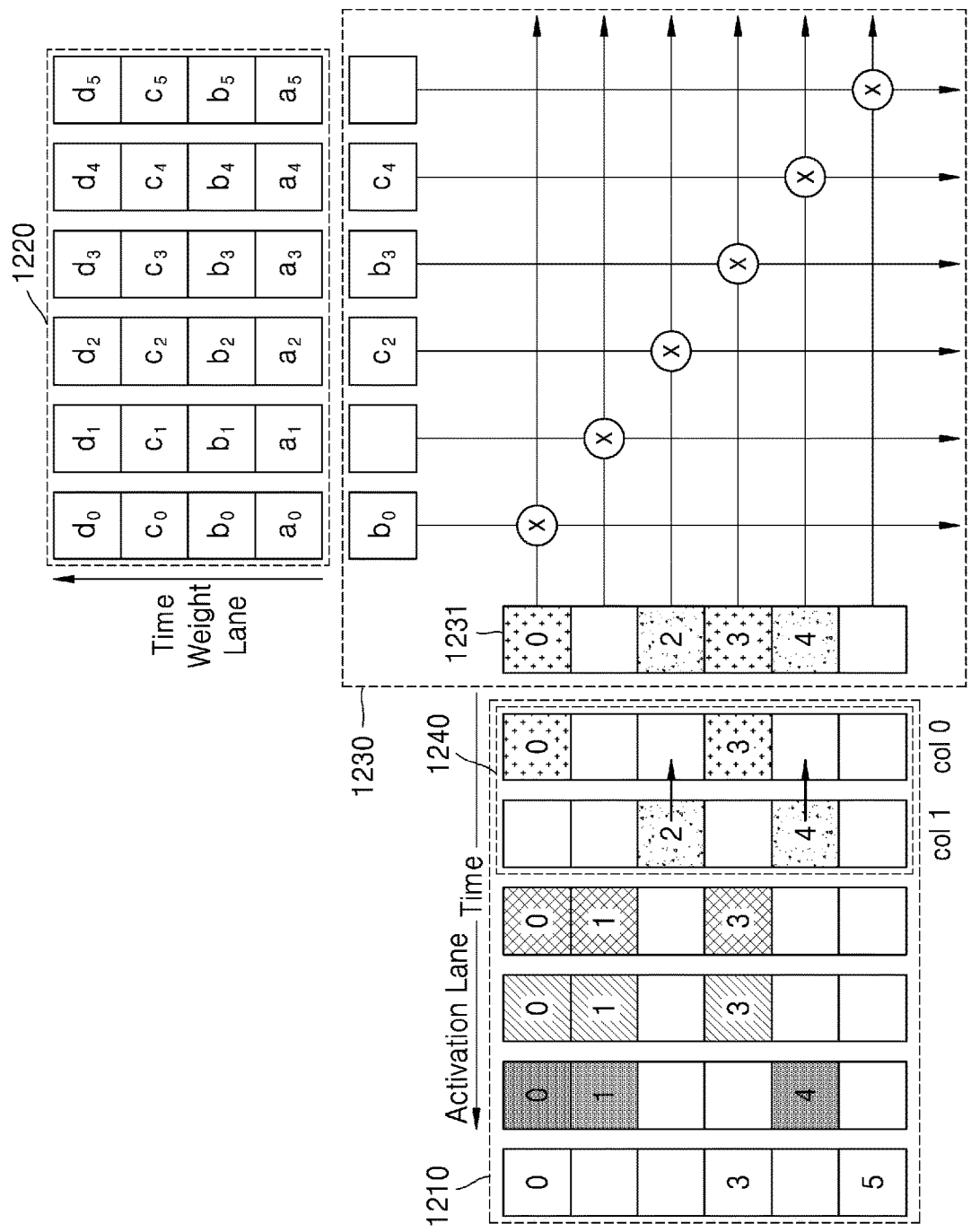
FIG. 12 is a view for describing an example in which a processor applies a second rule to rearranged data.

FIG. 12 is a view illustrating an example in which a processor applies a second rule to rearranged data.

Feature map data 1210 and kernel data 1220 are illustrated in FIG. 12. Hereinbelow, it is assumed that the feature map data 1210 is rearranged data of operation 520.

The processor 420 may input a part of the feature map data 1210 to a logic circuit 1230. For example, the processor 420 may input activations of the input feature map data 1210, which are included in a window 1240, to the logic circuit 1230. The processor 420 may input maximal activations to the logic circuit 1230 by applying the second rule to the activations included in the window 1240. That is, the processor 420 may apply the second rule to the activations included in the window 1240 to minimize a blank in an input layer 1231 of the logic circuit 1230. Herein, the second rule may mean a rule of shifting activations of the columns col 0 and 1 to the same positions of an adjacent column.

For example, the processor 420 may identify blanks of the columns col 0 and 1 in the window 1240 and assign the activations of the column col 1 to a blank of the column col 0. Referring to FIG. 12, activation 2 and activation 4 of the column col 1 may be shifted to the same positions of the column col 0.

The processor 420 may input the activations to which the second rule is applied to the input layer 1231 of the logic circuit 1230. Comparing the column col 0 with the input layer 1231, the number of blanks of the input layer 1231 may be smaller than the number of blanks of the column col 0. A blank has the same effect as including data 0, such that an output is 0 regardless of a value of a weight corresponding to a blank. Thus, as the number of blanks included in the input layer 1231 increases (i.e., the number of 0s included in the input layer 1231 increases), the number of unnecessary operations may increase.

As described above, the processor 420 may minimize the number of blanks included in the input layer 1231 by applying the second rule. Thus, the processor 420 may minimize the number of times the unnecessary operation is performed by the logic circuit 1230.

Figure 13:
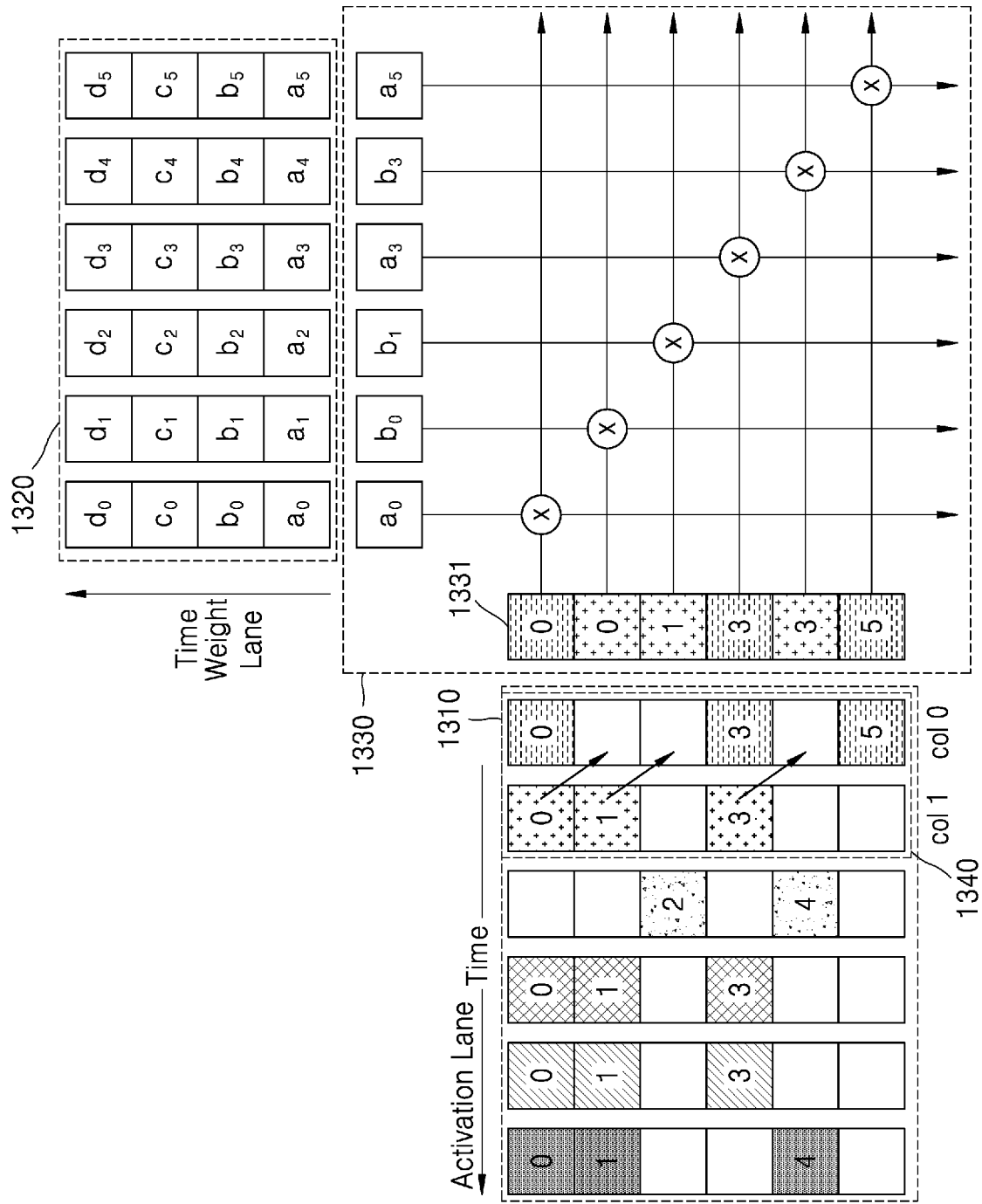
FIG. 13 is a view illustrating an example in which a processor applies a third rule to rearranged data.

FIG. 13 is a view illustrating an example in which a processor applies a third rule to rearranged data.

Feature map data 1310 and kernel data 1320 are illustrated in FIG. 13. Hereinbelow, it is assumed that the feature map data 1310 is rearranged data of operation 520.

The processor 420 may input maximal activations to the logic circuit 1330 by applying the third rule to the activations included in the window 1340. Herein, the third rule may mean a rule of shifting activations of the columns col 0 and 1 to the transversal positions of an adjacent column.

For example, the processor 420 may identify blanks of the columns col 0 and 1 in the window 1340 and assign the activations of the column col 1 to a blank of the column col 0. Referring to FIG. 13, activation 0, activation 1, and activation 3 of the column col 1 may be shifted to the transversal positions of the column col 0.

The processor 420 may input the activations to which the third rule is applied to the input layer 1331 of the logic circuit 1330. Comparing the column col 0 with the input layer 1331, a blank exists (more specifically, three blanks exist) in the column col 0, but no blank exists in the input layer 1331. Thus, the processor 420 may minimize the number of times the unnecessary operation is performed by the logic circuit 1230.

As described in detail with reference to FIGS. 12 and 13, the processor 420 may separately apply the second rule and the third rule, but the configuration is not limited thereto. The processor 420 may identify sparsities of feature map data 1210 and 1310 and kernel data 1220 and 1320, and adaptively apply at least one of the second rule or the third rule to feature map data 1210 and 1310 and/or kernel data 1220 and 1320.

As described in detail, the apparatus 400 for processing data may rearrange input feature map data and/or kernel data to minimize the number of blanks input to the logic circuit in which the convolution operation is performed. Thus, the apparatus 400 for processing data may minimize the number of times the unnecessary operation is performed.

Meanwhile, the foregoing method may be written as programs executable on computers, and may be implemented on general-purpose digital computers operating the programs by using computer-readable recording medium. A structure of data used in the above-described method may be recorded on a computer-readable recording medium using various means. The computer-readable recording medium may include storage medium such as magnetic storage medium (e.g., ROM, RAM, a universal serial bus (USB), floppy disks, hard disks, etc.), optical recording medium (e.g., compact disk (CD)-ROMs, digital versatile disks (DVDs), etc.), so forth.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing data in a neural network, the method comprising:
identifying a sparsity among information, included in input data, based on valid information or invalid information included in the input data;
generating a rearranged input data by rearranging the input data based on the sparsity among the information indicating a distribution of the invalid values included in the input data; and
generating, by performing a convolution operation on the rearranged input data and weights of the neural network, an output data.

2. The method of claim 1, wherein the generating of the rearranged input data comprises rearranging rows, included in the input data, based on a number of invalid values included in each of the rows.

3. The method of claim 2, wherein the generating of the rearranged input data comprises rearranging a first row, of the rows, comprising a most invalid values among the rows adjacent to a second row, of the rows, comprising a least invalid values among the rows of the input data.

4. The method of claim 1, wherein the generating of the rearranged input data comprises shifting elements of columns, included in the input data, according to a first rule.

5. The method of claim 4, wherein
the first rule comprises shifting the elements of the columns in a same direction by a particular size, and
the first rule is periodically applied to the columns.

6. The method of claim 1, wherein the generating of the rearranged input data comprises rearranging columns, included in the input data, such that the convolution operation is skipped on at least one column comprising only the invalid values.

7. The method of claim 1, wherein the generating of the rearranged input data comprises shifting a first element of a first column, included in the input data, to a position corresponding to a last element of a second column, of the input data, that is adjacent to the first column.

8. The method of claim 1, wherein the generating of the output data comprises:
applying one or both of a second rule and a third rule to the rearranged input data; and
performing the convolution operation on the weights and rearranged input data by applying the one or both of the second rule and the third rule.

9. A non-transitory computer-readable recording medium having recorded thereon a program for executing the method of claim 1 on a computer.

10. An apparatus for processing data in a neural network, the apparatus comprising:
a memory in which at least one program is stored; and
a processor configured to execute the at least one program and caused the processor to:

identify a sparsity among information, included in an input data, based on valid information or invalid information included in the input data;

generate a rearranged input data by rearranging the input data based on the sparsity among the information indicating a distribution of the invalid values included in the input data; and generate, by performing a convolution operation on the rearranged input data and weights of the neural network, an output data.

11. The apparatus of claim 10, wherein the processor is further configured to rearrange rows included in the input data based on a number of invalid values included in each of the rows.

12. The apparatus of claim 11, wherein the processor is further configured to rearrange a first row, of the rows, comprising most invalid values among the rows adjacent to a second row, of the rows, comprising least invalid values among the rows.

13. The apparatus of claim 10, wherein the processor is further configured to shift elements of columns, included in the input data, according to a first rule.

14. The apparatus of claim 13, wherein
the first rule comprises shifting the elements of the columns in a same direction by a particular size, and
the first rule is periodically applied to the columns.

15. The apparatus of claim 10, wherein the processor is further configured to rearrange columns, included in the data, such that processing is skipped on at least one column comprising only the invalid values.

16. The apparatus of claim 10, wherein the processor is further configured to shift a first element of a first column, included in the input data, to a position corresponding to a last element of a second column, included in the input data, that is adjacent to the first column.

17. The apparatus of claim 10, wherein the processor is further configured to apply one or both of a second rule and a third rule to the rearranged input data and perform the convolution operation on the weights and the rearranged input data by applying the one or both of the second rule and the third rule.

18. An apparatus for processing data, the apparatus comprising:
a memory in which at least one program is stored; and
a processor configured to execute the at least one program to:
identify a sparsity among information, included in input data, based on valid information or invalid information included in the input data;
rearrange the input data based on the sparsity among the information indicating a distribution of the invalid values included in the input data, and
generate output data by implementing a neural network that is input the rearranged input data,
wherein the neural network comprises weights.

19. An apparatus comprising:
one or more memories storing one or more programs; and
one or more processors configured to execute at least one of the one or more programs to:
determine, in input data, a location of an invalid value;
generate a first rearranged data by moving, in the input data, the location of the invalid value;
generate, by applying a rule to the first rearranged data, a second rearranged data by rearranging the first rearranged data; and
generate, by performing a convolution operation on the second rearranged data, output data.

20. The apparatus of claim 19, wherein the one or more processors are further configured to generate the rearranged data by shifting a valid value included in the input data to the location of the invalid value in the input data.

21. The apparatus of claim 19, wherein the one or more processors are further configured to generate the rearranged data by moving the invalid value to another location in the input data.

22. The apparatus of claim 19, wherein the one or more processors are further configured to generate the rearranged data by removing the invalid value from the input data.

23. The apparatus of claim 19, wherein the one or more processors are further configured to apply the rule to valid values included in a window of the first rearranged data to minimize a total number of invalid values included in an input layer of the window to be input to a logic circuit.

24. The apparatus of claim 23, wherein the rule includes shifting at least one valid value included in a layer of the window of the first rearranged data that is adjacent to the input layer to a corresponding position of the input layer that includes an invalid value.

25. The apparatus of claim 23, wherein the rule includes shifting at least one valid value included in a layer of the window of the first rearranged data that is adjacent to the input layer to a transversal position of the input layer that includes an invalid value.

26. The method of claim 1, wherein the generating of the rearranged input data comprises rearranging a location of at least one of valid values and invalid values in the input data.

27. The apparatus of claim 10, wherein the processor is further configured to generate the rearranged input data by rearranging a location of at least one of valid values and invalid values in the input data.

* * * * *